US012334735B2

(12) United States Patent
Paatero

(10) Patent No.: US 12,334,735 B2
(45) Date of Patent: Jun. 17, 2025

(54) POWER SUPPLY ASSEMBLY WITH REACTIVE POWER COMPENSATION

(71) Applicant: ABB Schweiz AG, Baden (CH)

(72) Inventor: Esa-Kai Paatero, Helsinki (FI)

(73) Assignee: ABB Schweiz AG, Baden (CH)

( * ) Notice: Subject to any disclaimer, the term of this patent is extended or adjusted under 35 U.S.C. 154(b) by 470 days.

(21) Appl. No.: 17/755,233

(22) PCT Filed: Nov. 6, 2020

(86) PCT No.: PCT/EP2020/081339
§ 371 (c)(1),
(2) Date: Apr. 25, 2022

(87) PCT Pub. No.: WO2021/089814
PCT Pub. Date: May 14, 2021

(65) Prior Publication Data
US 2022/0360083 A1 Nov. 10, 2022

(30) Foreign Application Priority Data
Nov. 7, 2019 (EP) .................................... 19207622

(51) Int. Cl.
*H02J 3/16* (2006.01)
*H02J 3/14* (2006.01)
(52) U.S. Cl.
CPC ............... *H02J 3/16* (2013.01); *H02J 3/144* (2020.01)
(58) Field of Classification Search
CPC .... H02J 3/16; H02J 3/144; H02J 9/062; H02J 3/1835; Y02B 70/30; Y04S 20/20
See application file for complete search history.

(56) References Cited

U.S. PATENT DOCUMENTS

| 6,295,215 B1* | 9/2001 | Faria | H02J 9/062 363/124 |
| 2008/0158917 A1* | 7/2008 | Chen | H02J 9/062 363/34 |

(Continued)

FOREIGN PATENT DOCUMENTS

| EP | 3088989 A1 | 11/2016 |
| WO | 2018234046 A1 | 12/2018 |

OTHER PUBLICATIONS

"Sagar Khare, Offline UPS Reference Design Using the dsPIC® DSC, 2011, Microchip Technology Inc, https://ww1.microchip.com/downloads/en/AppNotes/01279B.pdf" (Year: 2011).*

(Continued)

*Primary Examiner* — Santosh R Poudel
(74) *Attorney, Agent, or Firm* — Whitmyer IP Group LLC

(57) ABSTRACT

A power supply assembly including a source connection system including a primary source connection, a load connection, a converter system including at least one converter controllable for reactive power compensation, an energy saving transfer route connecting the primary source connection electrically to the load connection, and bypassing the converter system, and a control system. The control system is adapted to provide an efficiency optimization operation including transferring energy through the energy saving transfer route, and controlling the converter system according to an optimal operating scheme that optimizes efficiency of the power supply assembly while keeping reactive power drawn from the source connection system within a required range, wherein the optimal operating scheme defines an optimal combination for the converters used for reactive power compensation such that each of the converters operates in a predetermined optimal efficiency range thereof.

11 Claims, 2 Drawing Sheets

(56) References Cited

U.S. PATENT DOCUMENTS

| | | | |
|---|---|---|---|
| 2012/0181871 A1* | 7/2012 | Johansen | H02J 9/062 307/66 |
| 2014/0306533 A1* | 10/2014 | Paquin | H02J 3/46 307/43 |
| 2015/0333566 A1* | 11/2015 | Berard | H02J 9/06 307/64 |
| 2016/0322862 A1* | 11/2016 | Boratyn | G06F 1/3234 |
| 2019/0386593 A1* | 12/2019 | Zhong | G06F 30/20 |
| 2021/0083479 A1* | 3/2021 | Ganesh | H02K 7/183 |
| 2021/0152017 A1* | 5/2021 | Berger | H02J 3/32 |

OTHER PUBLICATIONS

European Search Report; Application No. EP 19 20 7622; Issued: Apr. 14, 2020; 2 Pages.
International Search Report and Written Opinion of the International Searching Authority; Application No. PCT/EP2020/081339; Completed: Nov. 24, 2020; Mailing Date: Dec. 10, 2020; 9 Pages.

\* cited by examiner

POWER SUPPLY ASSEMBLY WITH REACTIVE POWER COMPENSATION

TECHNICAL FIELD

The present invention relates to a power supply assembly.

BACKGROUND

It is known in the art to use converters of a power supply assembly for reactive power compensation during an energy saver mode. An example of such a known power supply assembly is described in publication WO2018/234046.

SUMMARY

It is an object of the present invention to improve efficiency of a power supply assembly whose converters are used for reactive power compensation. The objects of the invention are achieved by a power supply assembly described in the following.

The invention is based on the realization that in some operating situations, depending on a power supply assembly and load thereof, it is possible to improve total efficiency of the power supply assembly by increasing a number of converters used for reactive power compensation. The improvement of the total efficiency of the power supply assembly is achieved by selecting a combination of converters used for reactive power compensation such that each of the converters operates in a predetermined optimal efficiency range thereof.

In an embodiment, the power supply assembly according to present invention is part of an uninterruptible power supply system. In connection with uninterruptible power supply systems, an operative mode in which an efficiency optimization operation is used, is sometimes called an energy saver mode. In the energy saver mode, energy is transferred from a primary source connection to a load connection such that the energy flow bypasses converters of the power supply assembly.

BRIEF DESCRIPTION OF THE DRAWINGS

In the following the invention will be described in greater detail by means of preferred embodiments with reference to the attached drawings, in which.

DETAILED DESCRIPTION

Figure 1:
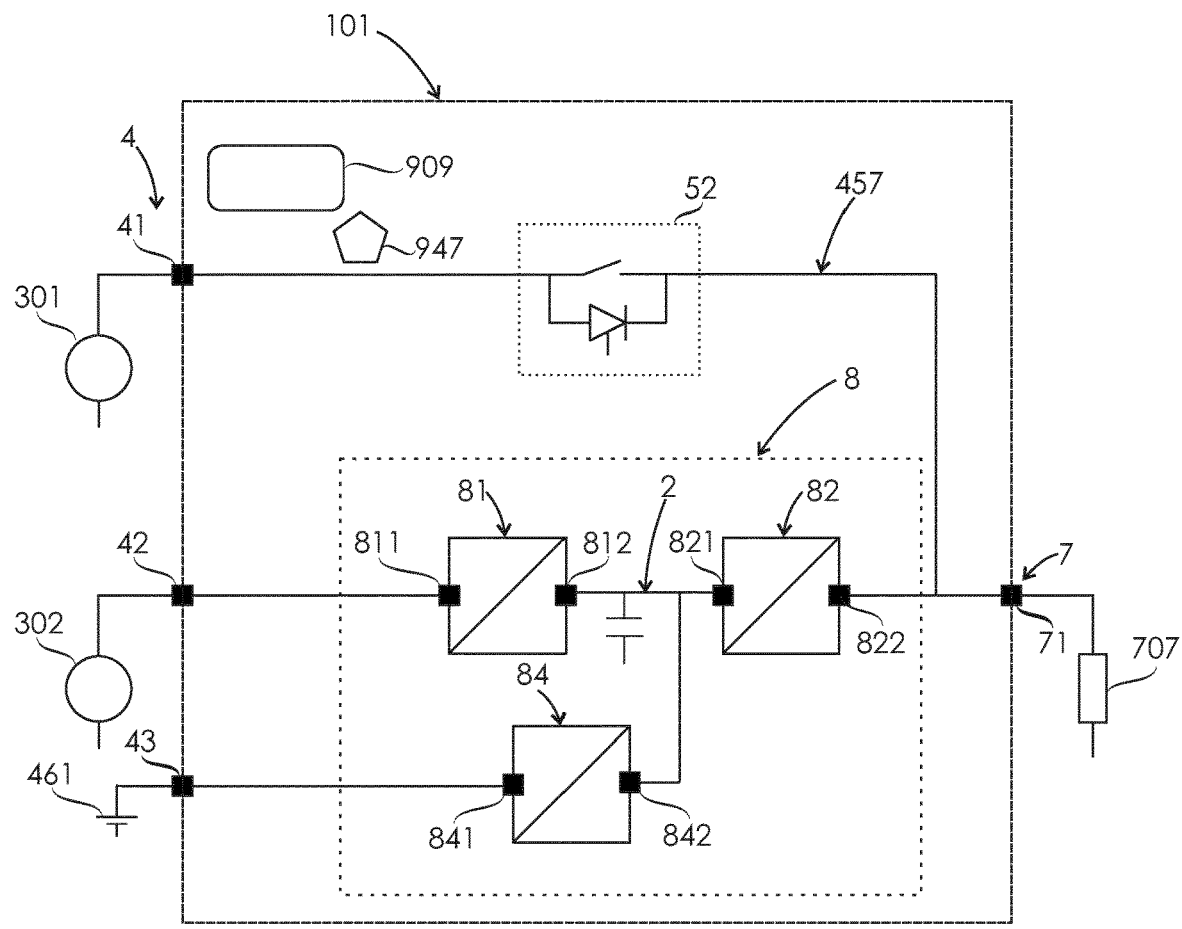
FIG. 1 shows a simplified circuit diagram of a power supply assembly according to an embodiment of the invention.

FIG. 1 shows a simplified circuit diagram of a power supply assembly 101 comprising a source connection system 4, a load connection system 7, a converter system comprising a plurality of converter modules 8, an energy saving transfer route 457, a power determining system 947 and a control system 909.

The source connection system 4 comprises two alternating current connections, and one direct current connection. One of the alternating current connections of the source connection system 4 is a primary source connection 41 adapted to be connected to a primary alternating current supply 301. The other of the alternating current connections of the source connection system 4 is a secondary source connection 42 adapted to be connected to a secondary alternating current supply 302. The direct current connection of the source connection system 4 is denoted with reference number 43, and is adapted to be connected to a direct current supply 461.

In an alternative embodiment, the source connection system comprises at least one alternating current connection, and optionally a direct current connection.

The load connection system 7 comprises a load connection 71 adapted to be connected to a load 707. The load 707 is an alternating current load.

The converter modules 8 of the converter system are connected in parallel, and are identical with each other. For sake of clarity, only one of the converter modules 8 is depicted. In an alternative embodiment, the converter system comprises at least one converter controllable for reactive power compensation, and connected electrically to at least one alternating current connection of the source connection system through an alternating current connection of the converter.

The converter module 8 comprises a rectifier 81, a DC link 2, an inverter 82, and a direct-current converter 84. The rectifier 81 is connected electrically to the secondary source connection 42 through an alternating current connection 811 thereof. The inverter 82 is connected electrically to the energy saving transfer route 457 through an alternating current connection 822 thereof.

The rectifiers 81 and the inverters 82 are functionally identical converter units with each other. Each rectifier 81 and each inverter 82 is a bidirectional converter adapted to transfer energy both from the alternating current connection thereof, and into the alternating current connection thereof.

The DC link 2 comprises DC link capacitance, and connects electrically the rectifier 81 to the inverter 82. The DC link 2 is connected to a direct current connection 812 of the rectifier 81, and to a direct current connection 821 of the inverter 82. The rectifier 81 and the inverter 82 are controllable for reactive power compensation.

The energy saving transfer route 457 connects the primary source connection 41 electrically to the load connection 71, and bypasses the converter system. The inverter 82 is connected electrically to the energy saving transfer route 457 through an alternating current connection 822 thereof. Therefore, the inverter 82 can be used for compensating reactive power passing through the primary source connection 41.

The rectifier 81 is connected electrically to the secondary source connection 42 through an alternating current connection 811 thereof. Therefore, the rectifier 81 can be used for compensating reactive power passing through the secondary source connection 42.

The energy saving transfer route 457 comprises a bypass switch 52 adapted to disconnect the primary source connection 41 from the load connection 71. The bypass switch 52 is controllable by the control system 909.

The bypass switch 52 comprises a mechanical switch and a thyristor connected in parallel. In an alternative embodiment, the bypass switch is a bi-directional semiconductor device comprising two controllable semiconductor switches connected antiparallel with each other. In a further alternative embodiment, the bypass switch comprises two controllable semiconductor switches connected antiparallel with each other, and a mechanical switch connected in parallel with the controllable semiconductor switches. The controllable semiconductor switch may be a field-effect transistor or an insulated-gate bipolar transistor, for example.

The power supply assembly 101 comprises only one bypass switch 52 which is common for the plurality of converter modules 8. In an alternative embodiment, the power supply assembly comprises a bypass switch system having a bypass switch for each converter module.

The power determining system 947 is adapted for determining power supplied into the power supply assembly 101 through the source connection system 4, and power supplied out of the power supply assembly 101 through the load connection system 7.

The control system 909 is adapted to control the converter system and the bypass switch 52. The control system 909 is adapted to provide an efficiency optimization operation comprising transferring energy from the primary source connection 41 to the load connection 71 through the energy saving transfer route 457, determining for the power supply assembly 101 an optimal operating scheme that optimizes coefficient of efficiency of the power supply assembly 101 while keeping reactive power drawn from the source connection system 4 within a required range, wherein the optimal operating scheme defines an optimal combination for the converters used for reactive power compensation such that each of the converters operates in a predetermined optimal efficiency range thereof, and controlling the converter system according to the optimal operating scheme. Said optimal combination for the converters used for reactive power compensation changes as a load of the power supply assembly changes.

In an embodiment, controlling the converter system according to the optimal operating scheme comprises hysteresis between transitions from one combination for the converters to another combination. Herein, hysteresis means that the optimal operating scheme comprises discrete steps overlapping each other in order to reduce number of changes between different combinations for the converters in situations where electric current at the load connection fluctuates at a boundary between two different optimal combinations for the converters.

Keeping reactive power drawn from the source connection system within a required range means that reactive current at alternating current connection(s) of the source connection system is kept lower than or equal to a predetermined reactive current value, and/or power factor is controlled such that it is greater than or equal to a predetermined power factor. In other words, in some embodiments it is not intention to compensate reactive power completely. Further, it can be said that the efficiency optimization operation optimizes coefficient of efficiency of the power supply assembly using boundary conditions relating to required level of reactive power compensation.

In general, selecting an optimal combination for the converters used for reactive power compensation comprises not only selecting a number of the converters but also takes into account a source connection to which each converter is connected through an alternating current connection thereof, as well as electrical characteristics of each converter. Referring to the embodiment of FIG. 1, only the inverters 82 can be used for compensating reactive power passing through the primary source connection 41, and only the rectifiers 81 can be used for compensating reactive power passing through the secondary source connection 42. In a general case, it is not possible to optimize coefficient of efficiency of the power supply assembly 101 by using either only the rectifiers 81 or only the inverters 82 for reactive power compensation.

Herein, a coefficient of efficiency of a power supply assembly is a quotient of an active power supplied out of the power supply assembly through the load connection system, and an active power supplied into the power supply assembly through the source connection system. The coefficient of efficiency takes into account power required for operating converters of the power supply assembly.

During the efficiency optimization operation, the converters used for reactive power compensation only supply reactive power, and no active power. In an alternative embodiment, for each of the converters used in the optimal operating scheme for reactive power compensation, a reactive power passing through an alternating current connection of the converter is at least 95% of an apparent power passing through the alternating current connection.

Figure 2:
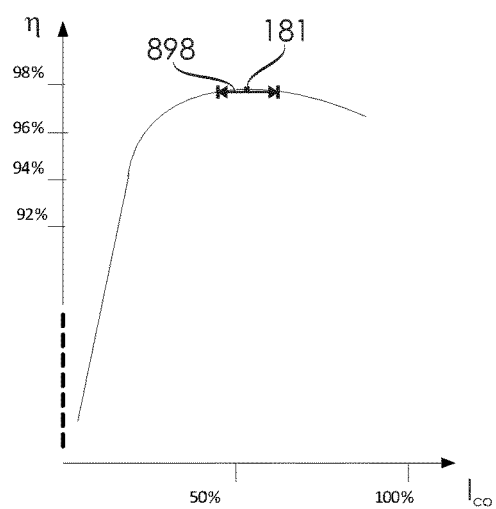
FIG. 2 shows an efficiency curve of a converter of the power supply assembly shown in FIG. 1.

FIG. 2 shows an efficiency curve of an inverter 82 of the power supply assembly shown in FIG. 1. Since the rectifiers 81 and the inverters 82 are identical converter units with each other, FIG. 2 also shows an efficiency curve of a rectifier 81 of the power supply assembly shown in FIG. 1. The efficiency curve FIG. 2 has an optimal efficiency operating point 181 that is included in a predetermined optimal efficiency range 898 of the converter.

A width of the predetermined optimal efficiency range 898 is approximately 20% of a nominal current of the converter. In alternative embodiments, a width of the predetermined optimal efficiency range is in a range of 5-40% of a nominal current of the converter.

The optimal operating scheme defines an optimal reactive power compensation for each converter used for the reactive power compensation. In the power supply assembly 101, rectifiers 81 and inverters 82 of the converter modules 8 are available for reactive power compensation. The control system 909 decides which rectifiers 81 and which inverters 82 are used for the reactive power compensation while the rest of rectifiers 81 and inverters 82 are kept currentless such that there is no electric current flowing in or out through their alternating current connections.

In an embodiment, each of the converters used for the reactive power compensation operates at the optimal efficiency operating point 181 thereof. In other words, each rectifier 81 and each inverter 82 either operates at the optimal efficiency operating point 181 thereof, or is kept currentless.

The control system 909 is adapted to calculate the optimal operating scheme based on initial data comprising information relating to power supplied out of the power supply assembly 101 through the load connection system 7, and information relating to electrical properties of components of the power supply assembly 101. The initial data comprises data received from the power determining system 947.

In an alternative embodiment, the control system is adapted to calculate the optimal operating scheme based on initial data comprising information relating to power supplied into the power supply assembly through the source connection system and/or power supplied out of the power supply assembly through the load connection system, and information relating to electrical properties of components of the power supply assembly.

In an embodiment, the control system utilizes for the determining of the optimal operating scheme at least one table comprising information relating to optimal operating schemes for different load situations of the power supply assembly. Use of precalculated tables reduces computing capacity required of the control system.

Figure 3:
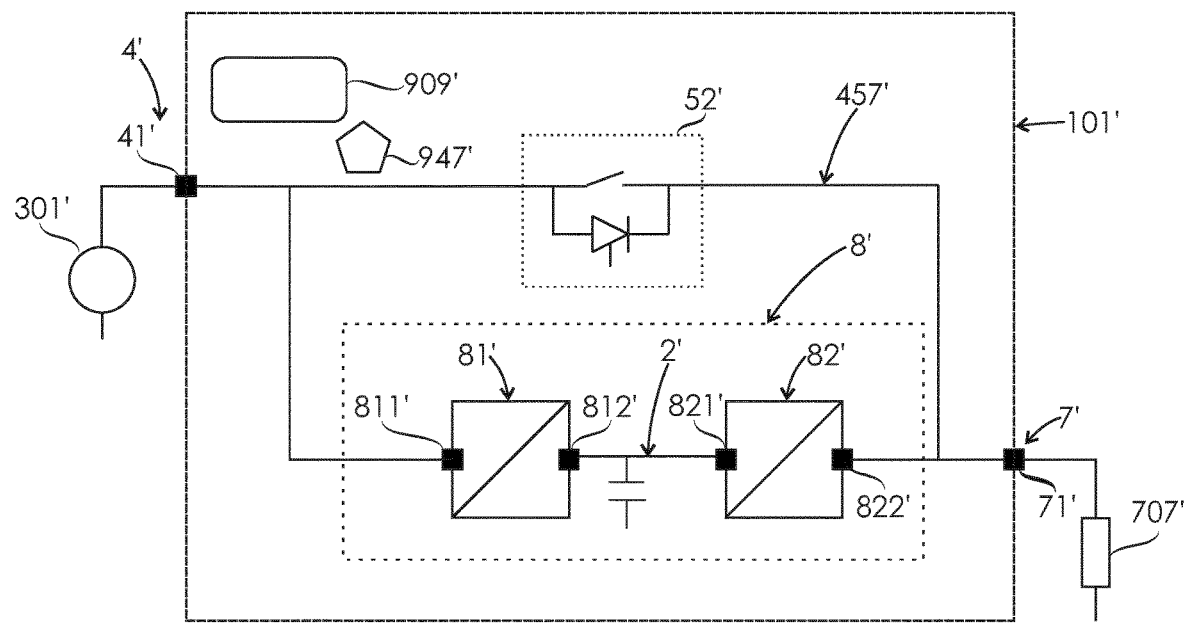
FIG. 3 shows a simplified circuit diagram of a power supply assembly according to another embodiment of the invention.

FIG. 3 shows a simplified circuit diagram of a power supply assembly 101' according to another embodiment of the invention. The power supply assembly 101' is a modification of the power supply assembly 101 shown in FIG. 1.

The power supply assembly 101' comprises a source connection system 4', a load connection system 7', a converter system comprising a plurality of converter modules 8', an energy saving transfer route 457', a power determining system 947' and a control system 909'.

The source connection system 4' of the power supply assembly 101' comprises one alternating current connection, and no direct current connections. The alternating current connection of the source connection system 4' is a primary source connection 41' adapted to be connected to a primary alternating current supply 301'.

The converter module 8' comprises a rectifier 81', a DC link 2', and an inverter 82'. The rectifier 81' is connected electrically to the energy saving transfer route 457', on one side of a bypass switch 52', through an alternating current connection 811' of the rectifier 81'. The inverter 82' is connected electrically to the energy saving transfer route 457', on the other side of the bypass switch 52', through an alternating current connection 822' of the inverter 82'. Both the rectifier 81' and the inverter 82' can be used for compensating reactive power passing through the primary source connection 41'.

Figure 4:
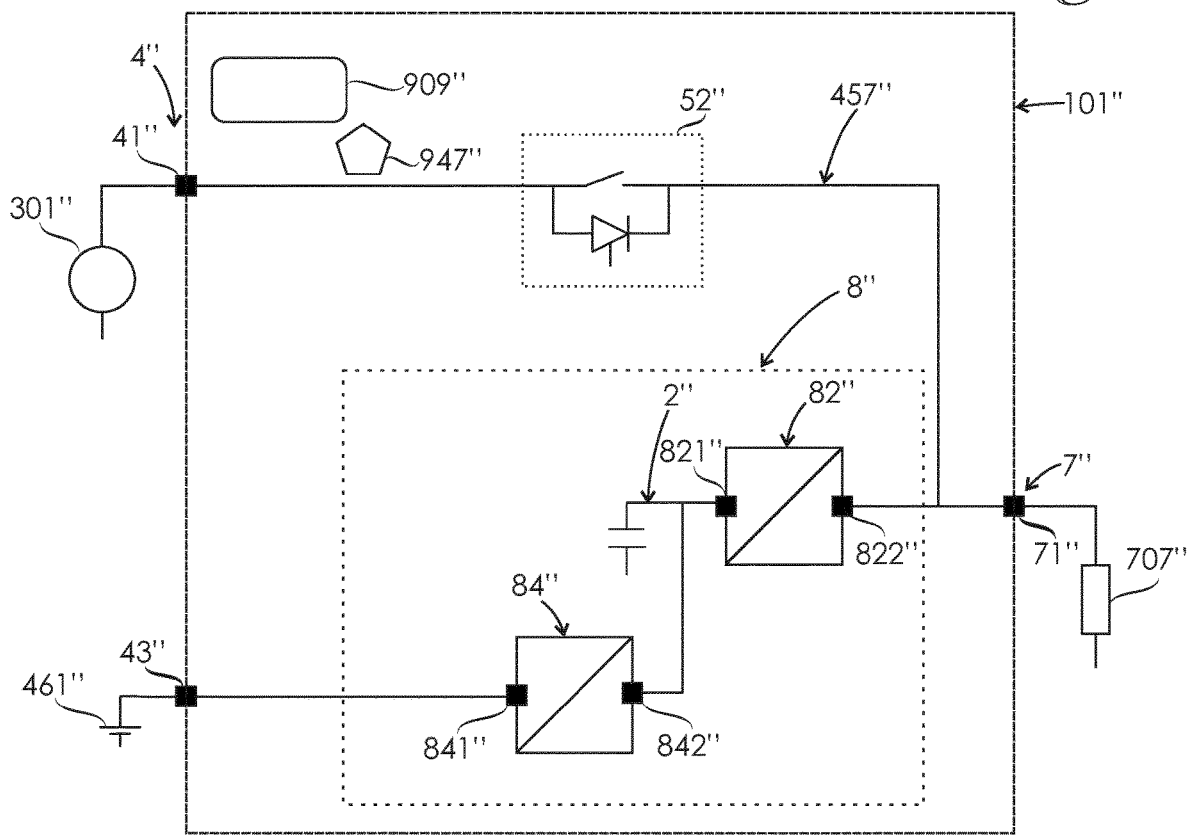
FIG. 4 shows a simplified circuit diagram of a power supply assembly according to yet another embodiment of the invention.

FIG. 4 shows a simplified circuit diagram of a power supply assembly 101" according to yet another embodiment of the invention. The power supply assembly 101" is a modification of the power supply assembly 101 shown in FIG. 1.

The power supply assembly 101" comprises a source connection system 4", a load connection system 7", a converter system comprising a plurality of converter modules 8", an energy saving transfer route 457", a power determining system 947" and a control system 909".

The source connection system 4" of the power supply assembly 101" comprises one alternating current connection, and one direct current connections. The alternating current connection of the source connection system 4" is a primary source connection 41" adapted to be connected to a primary alternating current supply 301". The direct current connection of the source connection system 4" is denoted with reference number 43", and is adapted to be connected to a direct current supply 461".

The converter module 8" comprises a direct-current converter 84", a DC link 2", and an inverter 82". The direct-current converter 84" is connected electrically between the direct current connection 43" and the DC link 2". The inverter 82" is connected electrically between the DC link 2" and the energy saving transfer route 457".

The energy saving transfer route 457" comprises a bypass switch 52" adapted to disconnect the primary source connection 41" from the load connection 71". The bypass switch 52" is located electrically between the primary source connection 41" and a point of the energy saving transfer route 457" to which an alternating current connection 822" of the inverter 82" is connected. The inverter 82" can be used for compensating reactive power passing through the primary source connection 41".

In an embodiment, each of the converters used in the optimal operating scheme for reactive power compensation comprises an LC filter at an alternating current connection thereof.

It will be obvious to a person skilled in the art that the inventive concept can be implemented in various ways. The invention and its embodiments are not limited to the examples described above but may vary within the scope of the claims.

The invention claimed is:

1. A power supply assembly comprising:
a source connection system comprising at least one alternating current connection, the at least one alternating current connection comprising a primary source connection adapted to be connected to a primary alternating current supply;
a load connection system comprising a load connection adapted to be connected to a load;
a converter system comprising at least one converter controllable for reactive power compensation, and connected electrically to the at least one alternating current connection of the source connection system through an alternating current connection of the at least one converter;
an energy saving transfer route connecting the primary source connection electrically to the load connection, and bypassing the converter system;
a power determining system for determining power supplied into the power supply assembly through the source connection system, and/or power supplied out of the power supply assembly through the load connection system; and
a control system adapted to control the converter system, wherein the control system is adapted to provide an efficiency optimization operation comprising:
transferring energy between the primary source connection and the load connection through the energy saving transfer route;
determining for the power supply assembly an optimal operating scheme that optimizes coefficient of efficiency of the power supply assembly while keeping reactive power drawn from the source connection system within a required range, wherein the optimal operating scheme defines an optimal combination for the at least one converter used for reactive power compensation such that each of the at least one converter operates in a predetermined optimal efficiency range thereof, and
controlling the converter system according to the optimal operating scheme,
wherein for each of the at least one converter used in the optimal operating scheme for reactive power compensation, a reactive power passing through an alternating current connection of the converter is at least 95% of an apparent power passing through the alternating current connection.

2. The power supply assembly according to claim 1, wherein the optimal operating scheme defines an optimal reactive power compensation for each of the at least one converter used for the reactive power compensation.

3. The power supply assembly according to claim 1, wherein the optimal operating scheme is adapted to control the converter system such that each of the at least one converter used for the reactive power compensation operates at an optimal efficiency operating point thereof.

4. The power supply assembly according to claim 1, wherein the control system is adapted to calculate the optimal operating scheme based on initial data comprising information relating to power supplied into the power supply assembly through the source connection system and/or power supplied out of the power supply assembly through the load connection system, and information relating to electrical properties of components of the power supply assembly.

5. The power supply assembly according to claim 1, wherein the control system is adapted to utilize for the determining of the optimal operating scheme at least one table comprising information relating to optimal operating schemes for different load situations of the power supply assembly.

6. The power supply assembly according to claim 1, wherein the at least one converter comprises an inverter connected electrically to the energy saving transfer route through an alternating current connection of the inverter.

7. The power supply assembly according to claim 1, wherein the at least one converter comprises a rectifier connected electrically to the energy saving transfer route through an alternating current connection of the rectifier.

8. The power supply assembly according to claim 1, wherein the at least one converter comprises a rectifier connected electrically to the energy saving transfer route through an alternating current connection of the rectifier, an inverter connected electrically to the energy saving transfer route through an alternating current connection of the inverter, and a DC link comprising DC link capacitance, and connecting electrically the rectifier to the inverter.

9. The power supply assembly according to claim 1, wherein the least one alternating current connection of the source connection system comprises a secondary source connection adapted to be connected to a secondary alternating current supply, and the at least one converter comprises a rectifier connected electrically to the secondary source connection through an alternating current connection of the rectifier, an inverter connected electrically to the energy saving transfer route through an alternating current connection of the inverter, and a DC link comprising DC link capacitance, and connecting electrically the rectifier (81) to the inverter (82).

10. The power supply assembly according to claim 1, wherein each of the at least one converter used in the optimal operating scheme for reactive power compensation comprises an LC filter at an alternating current connection of the converter.

11. The power supply assembly according to claim 1, wherein the energy saving transfer route comprises a bypass switch adapted to disconnect the primary source connection from the load connection, the bypass switch being controllable by the control system.

* * * * *